W. G. BAKER.
SAW.
APPLICATION FILED FEB. 19, 1921.

1,411,899.

Patented Apr. 4, 1922.

WITNESSES
W. G. Jones
A. L. Kitchin

INVENTOR
WILLIAM G. BAKER
BY Munn & Co
ATTORNEYS

UNITED STATES PATENT OFFICE.

WILLIAM GEORGE BAKER, OF NEW YORK, N. Y., ASSIGNOR TO CHRISTIAN BODRI, OF NEW YORK, N. Y.

SAW.

1,411,899.  Specification of Letters Patent.  Patented Apr. 4, 1922.

Application filed Feburary 19, 1921. Serial No. 446,356.

*To all whom it may concern:*

Be it known that I, WILLIAM GEORGE BAKER, a citizen of the United States, and a resident of the city of New York, Clason Point, borough of the Bronx, in the county of Bronx and State of New York, have invented a new and Improved Saw, of which the following is a full, clear, and exact description.

This invention relates to saws and has for an object to provide a special saw for sawing a specially constructed clothes pin whereby the clothes pin may more resiliently pinch a clothes line.

Another object of the invention is to provide a saw in which almost parallel saw members are presented together with a guiding or gouging trimming member.

In the accompanying drawing—

Figure 1:
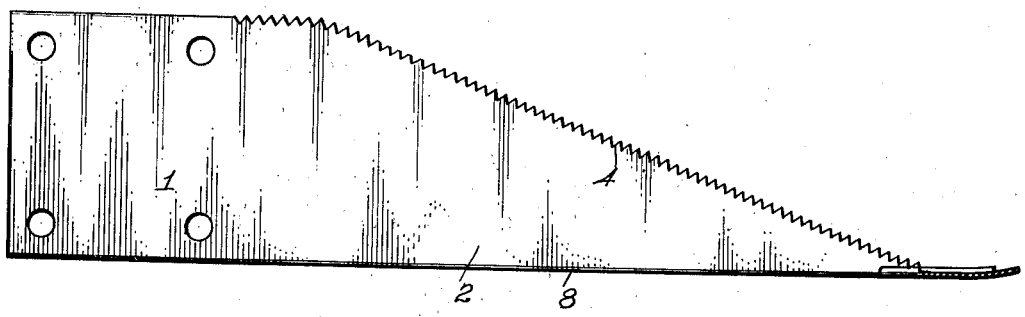
Figure 1 is a side view of a saw disclosing one embodiment of the invention.
Figure 2:
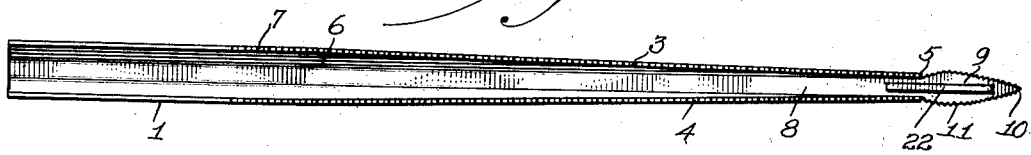
Figure 2 is a top plan view of the saw shown in Figure 1.
Figure 3:
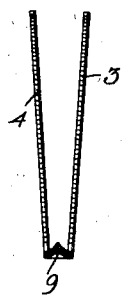
Figure 3 is a front end view of the saw shown in Figure 1.
Figure 4:
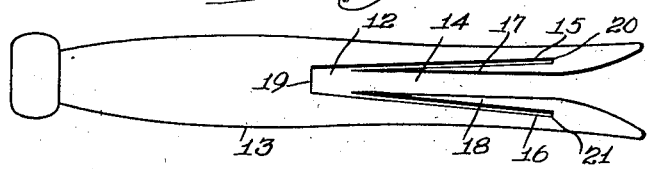
Figure 4 is a plan view of a clothes pin which has been operated on by the saw shown in Figure 1.

Referring to the accompanying drawing by numeral, 1 indicates what may be termed the shank of the saw which merges into the body 2. The body 2 is provided with saw members 3 and 4 having their cutting edges diverged from the front end 5 to about point 6 where they merge into sections 7 parallel with the back 8. It will be seen that the back 8 is approximately as wide as the body is at point 5 while the saw members 3 and 4 diverge. The back 8 merges into a member 9 which acts as a guiding and gouging member. Member 9 is formed with a turned up end 10 and with file teeth 11 on each edge so that when it enters at about point 12 of the clothes pin 13 it will freely enter the saw cut 14 at point 12 and the edges 11 will, if necessary, widen the saw cut at this point. In this manner the saw members 3 and 4 may readily begin their operation as soon as they are moved against the pin 13 sufficiently. In using the saw it is desired to form two saw cuts 15 and 16 so as to produce resilient tongues 17 and 18.

In order to operate the saw and produce these results the back 8 of the saw is maintained against the wall 19 and is reciprocated back and forth preferably at a rather high speed and at the same time is gradually moved through the pin until the straight sections 7 operate to cut straight walls at points 20 and 21. A suitable stiffening member 22 is provided on the inner face of the guide 9, said stiffening member being either a separate member secured in place thereon or pressed upwardly therefrom, said stiffening member extending over part of the back 8.

What I claim is:—

1. A saw comprising a pair of parallel wedge-shaped saw members, and a guiding projection arranged at one end of said body.

2. A saw of the character described comprising a pair of saw members, a guiding extension arranged at the front of the saw members and a reinforcing structure extending from between the saw members almost across the extension for bracing and stiffening said extension.

3. A saw of the character described comprising a pair of parallel saw members having the teeth of the same character diverging from the front to the rear whereby said teeth operate at the same time, a back connecting said saw members together, said back being straight and arranged at an angle to said teeth and a guiding extension projecting from the front of said back, said extension having a somewhat rounded front end.

WILLIAM GEORGE BAKER.